Inventors
James L. Amos
Joseph C. Frank
Kenneth E. Stober

By Griswold & Burdick
Attorneys

United States Patent Office 2,714,101
Patented July 26, 1955

2,714,101

PROCESS OF CONDUCTING EXOTHERMIC BULK POLYMERIZATION

James L. Amos, Joseph C. Frank, and Kenneth E. Stober, Midland, Mich., assignors to The Dow Chemical Company, Midland, Mich., a corporation of Delaware Application January 6, 1950, Serial No. 137,255

2 Claims. (Cl. 260—93.5)

This invention relates to an improved method for the polymerization of unsaturated organic liquids.

This application is a continuation-in-part of our copending application Serial No. 591,138 filed April 30, 1945, now abandoned.

In making synthetic polymers having certain desired properties, the monomeric liquid starting materials must be polymerized en masse, that is, in the absence of solvents or other liquid media. Unfortunately, such a process, although easily accomplished in the laboratory, presents very troublesome problems of temperature control when applied to polymerizing large quantities of monomer in a single vessel, as seems desirable for industrial operations.

Most polymerization reactions, once initiated, liberate very considerable quantities of heat. In addition, the polymerizing mass early becomes so viscous that the rate of heat transfer between even relatively close portions of the mass is very poor. In consequence, when a large body of monomer is polymerized, difficulty is experienced in removing the heat uniformly and as fast as it is liberated; extreme local overheating often occurs. In the overheated areas, reaction proceeds too rapidly, forming polymers of low molecular weight which appear as inhomogeneities in the final product. In addition, in autocatalytic polymerizations, it is not uncommon for such local overheating to spread rapidly, causing a general rise in temperature, which may reach such proportions as to render the entire contents of the vessel discolored and unusable, or even to result in an explosion. For these reasons, mass polymerization in large vessels, as heretofore carried out has rarely been an acceptable commercial process.

The principal object of the present invention, then, is to provide an improved method for carrying out exothermic mass polymerization which avoids the difficulties mentioned and permits the use of very large vessels in producing a polymer of uniform and carefully controlled physical properties.

In the process of the invention, polymerization is carried out in a zone having heat-transfer surfaces of controlled temperature so arranged therein that substantially every portion of the liquid being polymerized is within three inches of such a surface. Further, the surfaces are made of such size that the area thereof is at least 3 square feet per cubic foot of liquid. By thus providing short-distance thermal paths from all portions of the polymerizing liquid to large heat-transfer surfaces, no high thermal gradients can be set up anywhere in the vessel. Local overheating, when it occurs, is very limited in extent.

In the preferred form of the new process, provision is also made for detecting the onset of local overheating in any part of the polymerizing mass and for supplying immediate cooling to the zone in which the overheating occurs.

The close spacing of the heat-transfer surfaces throughout the polymerizing zone is a critical feature of the invention. The surfaces, which are conveniently metal tubes or like hollow indirect heat-transfer conduits, should be dispersed throughout the zone so that substantially every portion of the polymerizing liquid is within three inches of a surface. Closer spacing, so that the maximum distance of any heat-conduction path is only two inches, is much preferred. Even shorter paths are desirable but considerations of vessel construction and of free drainage of the final polymer make them difficult to attain. As an illustration of the importance of the spacing, it may be noted that when the polymerizing liquid is styrene, and the heat-transfer surfaces are held at 100° C., even with a three-inch heat-conduction path local overheating of as much as 60° to 80° C. or more is experienced. With greater spacings, as in prior practice, ruinous overheating is almost inevitable. On the other hand, if a maximum heat-path of two inches or less is provided, temperatures throughout the mass remain readily controllable.

The high area of the heat-transfer surfaces in the polymerizing zone is also a critical feature of the invention. These surfaces should present at least 3 square feet per cubic foot of liquid volume, with greater areas up to a practical limit of about 30 square feet per cubic foot, being more desirable. Here again, with styrene for example, areas below the minimum given permit ruinous overheating.

An additional important feature in invention is the provision of adequate detection of incipient overheating at any portion of the polymerizing mass. To this end, the temperature is measured periodically at a plurality of points throughout the polymerizing zone, and corrective cooling is supplied whenever any of those points exceeds the predetermined polymerizing temperature. Experience has shown that all regions in a zone containing an overheated spot should be cooled, and not merely the immediate vicinity of the spot itself if runaway polymerization is to be forestalled effectively. In the invention, the temperature-measuring points should be spaced throughout the zone with far greater frequency than has been practiced in the past, i. e. with one thermoelement for at most every six cubic feet of liquid in the zone. Closer spacing, up to one element per cubic foot, offers further advantage.

The process of the invention requires comparatively expensive and elaborate apparatus. A preferred form of such apparatus may be explained in detail with reference to the accompanying diagrammatic drawings, in which Fig. 1 shows a polymerizing tower and associated equipment, in front elevation;

*Tower*

Figure 1:
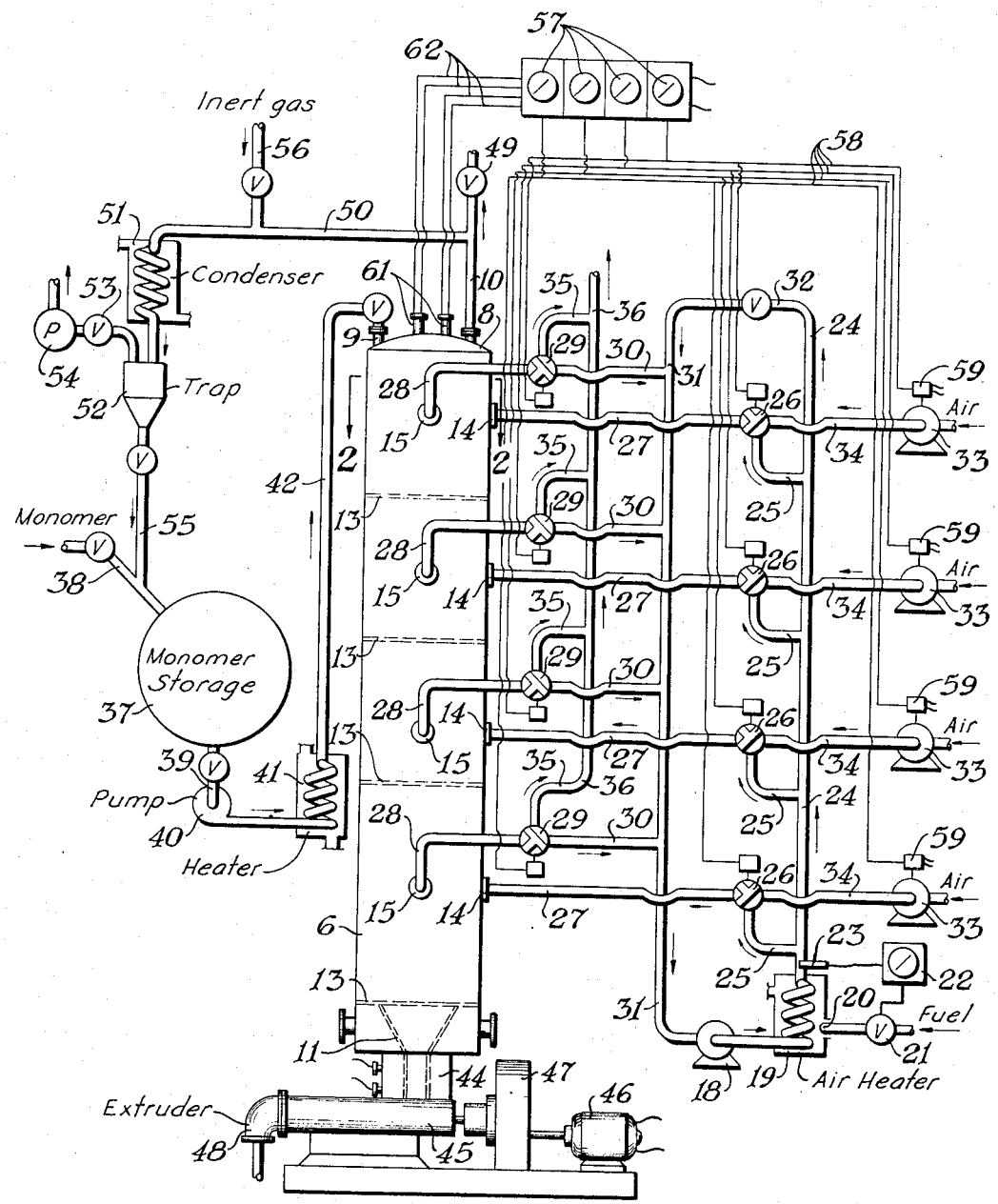

In the apparatus illustrated, polymerization of the monomeric starting material is carried out in a tower (Figs. 1 to 3) consisting of an outer air-circulating jacket 6 covered with thermal insulation not shown and an inner shaft 7 of rectangular cross-section which constitutes the polymerizing vessel. The walls of the shaft are formed of steel or special alloy plates seam-welded at their edges. At the top, the shaft is closed by a dome 8 through which a filler pipe 9 and an exhaust pipe 10 enter, and at the lower end it terminates in a rusto-pyramidal bottom piece 11.

Air circulating system

Throughout its height, the shaft 7 is fitted inside with a large number of heat-exchange tubes 12 which extend through and are rolled and welded into the wall plates. The tubes are spaced closely and are set in rectangular cross array, i. e. with the tubes in straight rows, those of each row being transverse to those of the two adjacent rows.

Figure 2:
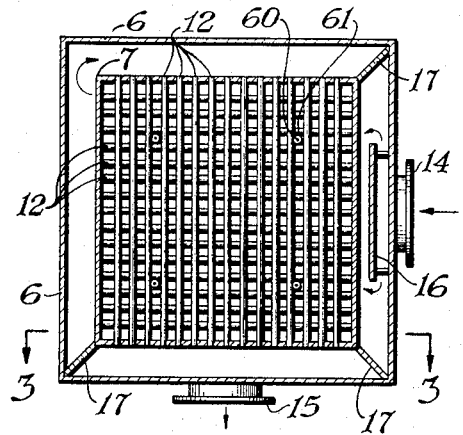
Fig. 2 is a sectional view of the tower, taken horizontally along the lines 2—2 in Fig. 1.

These tubes 12, by functioning as conduits through which hot or cold air can be forced, serve as the principal means for controlling the temperature of material being polymerized in the shaft 7. The flow of air through the tubes 12 is directed into appropriate paths by the outer jacket 6, which is divided into four entirely separate air-circulating sections or zones by horizontal dividing plates 13 set at intervals down the tower. Each section of the jacket is provided with an air inlet 14 and outlet 15 and contains an air-distributing baffle 16 opposite the inlet and a number of flow-directing baffles 17. As shown in Fig. 2, the air entering the inlet 14 of any jacket section strikes the deflector 16 and is distributed over the face of the shaft exposed in that section. It then flows through the tubes into the opposite side of the jacket, turns a corner, and flows back through the cross-tubes to the outlet 15.

The hot air required for raising the tower to a polymerizing temperature is distributed to the separate sections of the jacket 6 by a circulating system in which the air is kept in motion by a fan 18 (Fig. 1). This fan discharges into an indirect heater 19 fired by a gas burner 20, the control valve 21 of which is regulated by a thermostat 22 in response to the indications of a temperature-sensitive element 23 in the heater outlet. The hot air leaving the heater 19 enters a supply manifold 24, from which it flows to each of the tower sections through an individual take-off line 25, an electrically-actuated spring-opposed three-way valve 26 and a line 27 into the section inlet 14. The air leaving the outlet 15 of each jacket section flows through an exhaust pipe 28, an electrically-actuated spring-opposed three-way valve 29, and a line 30 into a collecting header 31 which returns the air to the inlet of the fan 18 for recirculation. For convenience in operation, the supply manifold 24 and return header 31 are interconnected by a bleed valve 32 which may be adjusted to maintain appropriate air pressures between the supply and the exhaust sides of the circulating system. In general, the thermostat 22 is set to hold an air temperature just high enough to maintain the contents of the tower at a desired polymerizing temperature without heating it above that temperature.

Air for cooling the contents of the tower in the event of local overheating during polymerization is supplied to the individual sections of the tower jacket 6 by auxiliary fans 33, one for each section. Each fan discharges air at ordinary temperature into a line 34 leading into the same three-way valve 26 to which heating air can be directed, and thence through the line 27 into the section inlet 14. After passing through the tubes 12, the air leaves the tower section at the outlet 15, flowing out the exhaust pipe 28 to the three-way valve 29, from which it is led through a line 35 into a vent stack 36 from which it escapes to the atmosphere.

By regulating the operation of the hot air-circulating system and the auxiliary cooling fans, and by positioning the three-way valves 26 and 29 to supply hot or cool air to each tower section as required, the temperature of the material being polymerized in the tower can be controlled within close limits, as will be later described in detail.

Auxiliaries

Monomeric material to be processed in the tower is stored in a tank 37, which can be filled through a valved inlet 38. Monomer may be withdrawn from storage through a valved drain 39 and forced by a pump 40 through a preheater 41 and a valved feed line 42 into the filler pipe 9 at the top of the tower.

Polymerized product is withdrawn from the bottom piece 11 which is provided internally with tubes 43 through which a heated fluid (from a source not shown) may be circulated as required to keep the polymer hot enough to flow freely from the tower. The polymer enters an electrically heated hopper 44, and from there runs into the cylinder of a screw-feed extrusion press 45, which is driven by a motor 46 through a variable speed reducer 47. Under the action of the press, the polymer is forced out through a die 48 which shapes the polymeric product into final form.

During filling and during polymerization, the tower may be vented at the top through the exhaust line 10 which terminates in a valve 49 leading to the atmosphere. Alternately, the vent gas may be withdrawn from the exhaust line 10 through a transfer line 50 into a condenser 51 for liquefying volatile components, chiefly vapors of the monomer, thence into a separating trap 52 to remove liquid formed in the condenser, and finally through a valved line 53 into an exhaust pump 54 which discharges into the atmosphere. Condensate in the trap 52 may be returned to the monomer storage tank 37 through a valved line 55. Inert gas may be introduced into the system, if desired, through a valved inlet 56 leading into the gas transfer line 50.

Control system

The operation of the air heating and cooling systems for controlling the temperature of material being polymerized is regulated by four pyrometer controllers 57, one for each of the independent air-circulating sections of the tower jacket 6. Each controller 57 functions to detect local overheating of the material polymerizing in one section of the tower and is connected to energize an electric circuit 58 which interlocks the actuating elements of the three-way air valves 26 and 29 and the starting relay 59 of the auxiliary fan 33 associated with that particular section of the tower. When a circuit 58 is energized, the valve 26 is turned by its actuator to interconnect the jacket inlet line 27 with the auxiliary fan discharge line 34; the valve 29 is likewise moved to connect the jacket exhaust line 28 to the vent line 35, and the fan 33 is set in motion to circulate cooling air through the tower section. On the other hand, when the circuit 58 is de-energized by its controller, the fan 33 is stopped, the valve 26 returns by its spring action to connect the jacket inlet line 27 with the hot air supply line 25, and the valve 29 likewise turns to connect the exhaust line 28 to the return line 30. Hot air then circulates through the tower section.

Figure 4:
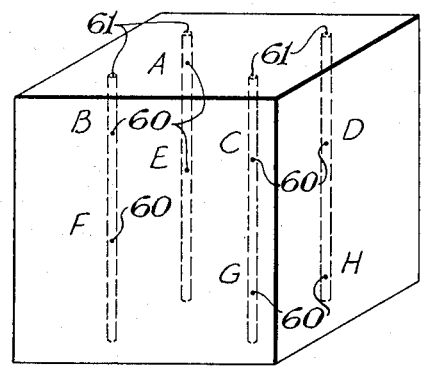
Fig. 4 is a schematic perspective view of one section of the tower, with the tubes removed, illustrating the placement of thermocouples.

For detecting local overheating in the tower, each pyrometer controller 57 is connected periodically to each of a number of thermocouples 60 spaced throughout that part of the tower corresponding to the particular air-circulating section of which the controller is a part. In the particular arrangement shown in Figs. 2 to 4, the thermocouples 60 are placed within four long pipe wells 61 which enter the shaft 7 through the dome 8 and extend downward between the tubes 12 to a level just above the bottom piece 11, the wells being spaced about midway between the center and the corners of the shaft. Each well 61 contains eight thermocouples, all of different length, two for each of the four independently controlled sections of the tower. Within each tower section, the two thermocouples in each of the four wells 61 (indicated as A to H, Fig. 4) are all set at different levels, so that they together provide an effective indication of the temperatures prevailing throughout the tower section.

Figure 5:
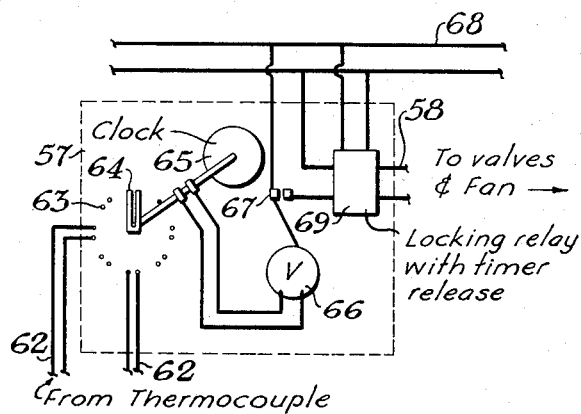
Fig. 5 is the basic wiring diagram of an electrical circuit for operating the temperature controlling valves and fan associated with one section of the tower.

In the control circuit illustrated in Fig. 5, the lead wires 62 from the thermocouples in each tower section are brought into the controller 57 and are connected to the taps of a selector switch 63, the rotor 64 of which is turned from tap to tap at regular intervals, e. g. once a minute, by a clock 65. The potential from the thermocouple in circuit is indicated on a millivoltmeter 66, having mechanism for closing a switch 67 when the potential indicated exceeds a set value and for opening it when it falls below that value. When the switch 67 is closed, current from a source 68 closes a timer-released self-locking relay 69. When this relay closes, current from the source 68 flows in the interlocking circuit 58, actuating the valves 26 and 29 and the fan starter 59 and causing cooling air to flow through the corresponding tower section. After the interval for which the timer of the relay 69 is set elapses, the relay then opens, de-energizing the circuit 58 and thus permitting the flow of heated air to the tower to resume. In general, the timer of the relay 69 should be set for an interval such that the cooling air flows long enough to overcome any local overheating in the tower section without flowing so long that the tower contents are cooled substantially below the control temperature. An interval of 5 to 15 minutes is ordinarily a satisfactory setting for most polymerizations.

In operation of the controller 57 of Fig. 5, rotation of the selector switch 63 permits the voltmeter 66 to determine in squence the readings of the various thermocouples in the tower section. As long as these couples continue to indicate temperatures below the set point of the voltmeter control switch 67, the relay 69 remains open and heated air circulates through the tubes 12 of the tower section. However, as soon as the selector switch connects the voltmeter to a thermocouple which indicates that the temperature of its surroundings has risen, usually as a result of local overheating, the switch 67 and relay 69 trip, starting the flow of cooling air to the tower section, which continues until the timer releases the relay 69. If, after such release, one or more of the thermocouples should still indicate overheating, the relay 69 would again be energized and another cooling cycle would be initiated. Ordinarily, however, one or two cooling cycles are sufficient to overcome local overheating before it reaches significant proportions.

*Operation*

In the polymerization of monomeric liquids in the apparatus described, best results are usually achieved by batchwise operation.

At the start of a batch run, the shaft 7 is sealed at the bottom by a mass of polymer formed at the close of the preceding run. At such time, heating of the bottom piece 11 and of the hopper 44 was discontinued while these parts still contained liquid polymer, and the latter was allowed to cool, forming a tight plug.

With the bottom seal in place, the hot air fan 18 and heater 19 are started and the thermostat 22 is set to maintain an air temperature equal to, or slightly above, that desired for initiating polymerization. The controllers 57 are likewise set so that all sections of the tower demand the same initial temperature. Under these conditions, the heated air from the manifold 24 flows through all the tubes 12 in the tower, raising it to the operating temperature and holding it at this value.

The tower is then evacuated through the pump 54 to remove air and other possible gaseous contaminants. Monomer is withdrawn from storage 37 and is pumped through the heater 41 into the tower, the heater being adjusted so that the monomer is raised to approximately the initial polymerizing temperature. As the hot monomer enters the evacuated tower and splashes down over the heated tubes 12, dissolved gases and other volatile impurities are rapidly flash-vaporized, together with a small part of the monomer itself, so that the body of the liquid is nearly gas-free. Addition of monomer is continued until the tower is entirely full, at which time the vacuum in the line 50 is broken with an inert gas, such as nitrogen or natural gas.

Polymerization is then carried out at such temperatures and for such times as are required to make a polymer having the particular properties wanted. The flow of heating air, under the control of the thermostat 22, through the tubes 12 serves to maintain the monomer throughout at a temperature for initiating polymerization. Once polymerization is under way, and liberation of heat within the mass begins, the setting of the thermostat 22 may be lowered a few degrees. In this way, the air circulating through the tubes 12 from the heater manifold 24 is slightly cooler than the liquid mass and tends to withdraw most of the heat of polymerization without significantly lowering the temperature of any portion of the mass in which polymerization may be somewhat slow. At the same time, the controllers 57 are set to detect onset of local overheating in any of the individual tower sections and to supply cooling air to any overheated section without cooling any other section unnecessarily, as already explained in detail. With these settings, the entire mass of polymerizing liquid may be maintained at very nearly the same temperature throughout until polymerization is complete, and a polymer of exceptional homogeneity and of a satisfactorily limited range of molecular weights may be obtained.

In making certain polymers, it is unnecessary to maintain the initial polymerizing temperature unchanged until reaction is complete. The first part of the reaction may be carried out at a low temperature, after which considerable time may be saved by raising the temperature of the mass to a higher value to finish the process. In such a case, and with the apparatus described, polymerization is initiated and carried on for a time as explained, after which is is merely necessary to raise the control points of the heater thermostat 22 and the controllers 57. The later stages of the process may then be carried out at the higher temperature, still with the excellent uniformity of temperature throughout the mass and the control of local overheating which are characteristic of the present invention. For example, in the polymerization of styrene, the initial stages are carried out in the range of 80° to 125° C., depending on the type of polymer desired, while the final stages are usually at 125° to 200° C.

As polymerization proceeds, the volume of material in the tower usually decreases and it is necessary to add inert gas through the line 50 to maintain protection against entry of air or moisture. The decrease in volume, if carefully measured, serves as a rough indication of the extent of polymerization.

When polymerization is complete, the settings of the heater thermostat 22 and controllers 57 are raised so that the tower heats uniformly to a temperature at which the polymer is fluid. The bottom piece 11 and the hopper 44 of the extruder are also heated to that same temperature. The extruder 45 is then set in operation, and polymeric product is forced through the die 48, the extruded product being removed and cooled as fast as it issues. Extrusion is continued until the shaft 7 is nearly empty, after which the hopper 44 and bottom piece 11 are cooled to form a plug of polymer, and the temperature of the tower is returned to a lower value ready for the next batch of monomer.

In an alternative method of operating the apparatus illustrated, which is applicable especially in making polymers having a relatively low viscosity, polymerization may be carried out continuously. Monomer is added slowly to the top of the tower, and polymer is withdrawn steadily from the bottom at a corresponding rate. In this case, the individual tower sections may, if desired, be regulated to maintain temperatures increasing successively from top to bottom.

*Discussion*

Figure 3:
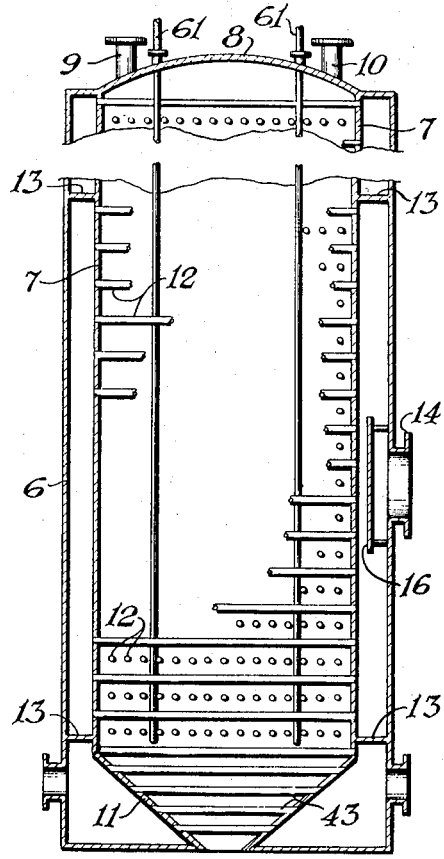
Fig. 3 is another sectional view of the tower, vertically on the lines 3—3 in Fig. 2.

As previously explained, in order effectively to prevent local overheating during polymerization in the process of the invention, it is important that the cooling tubes 12 be spaced uniformly throughout the shaft 7 and at sufficiently close intervals that every point in the polymerizing mass is within a short distance, two to three inches at most, of a tube surface. It is also important that the tubes be of sufficient diameter to present to the surrounding material a surface great enough to remove any amount of heat likely to reach it without itself changing temperature significantly. Best results have been obtained when the tubes are chosen and spaced to present a surface area in the approximate range of 3 to 30 square feet per cubic foot of monomer capacity, the higher values in the range being preferred for the higher polymerization temperatures, e. g. 100° C. or more. A tube spacing of 1.0 to 1.25 inch outside diameter thin-wall tubes set on 3.0 inch centers, cross array, as shown in Figs. 2 and 3, has been found very satisfactory over a variety of conditions. However, other arrays of tubes may be used.

It is also essential, in order to secure a highly uniform polymer, that the thermocouples 60 be spaced regularly throughout the tower and at frequent intervals, to permit early detection of local overheating. One thermocouple for every 1.0 to 6.0 cubic feet of polymerizing material is preferred. While the use of thermocouples and all-electric control equipment is ordinarily most convenient for detecting temperature rise and initiating corrective flow of cooling air, other temperature-sensitive elements and control systems may be used.

By way of illustration, in the apparatus of the drawings, the heat-exchange tubes in the shaft 7 are shown as supplied by four independent air-circulating systems, thus dividing the tower into four separate heat-transfer regions. However, division into other numbers of systems, or operation of the entire tower as a single zone, is equally possible within the invention.

In the apparatus described, each temperature controller 57 operating the three-way valves 26 and 29 in the air-flow system to each tower section is of the "off-on" type, so that air flow to the tubes 12 is introduced alternatively from the hot-air header 24 and the cold-air fan 33. However, it is equally possible, and in some cases desirable, to use throttling valves and modulating controllers, which vary the setting of such valves so that heated and cold air, mixed in any relative flow proportions demanded by the controller, are supplied to the tubes 12.

The circulation of air or other gas for heating and cooling the tubes within the tower, as explained in detail, is especially satisfactory because of the freedom from hazard, ease of control, and the rapidity with which it is possible to change the temperature of the circulating medium. However, it is possible to use a liquid as the heat-transfer fluid and still retain many of the advantages of the invention.

In so far as known, the apparatus and method of the invention may be advantageously applied to the polymerization of any unsaturated organic liquid which polymerizes to a liquid or a thermally stable fusible resinous polymer. It is especially useful in polymerizing monomeric or partially polymerized monovinyl compounds, such as nuclear vinyl aromatic hydrocarbons and their derivatives, e. g. styrene and chlorostyrene, unsaturated esters of acyclic acids, such as vinyl acetate, and the alkyl esters and nitriles of acrylic acid and its homologs, and in making copolymers based on these materials, in the presence or absence of other minor constituents, such as polymerization catalysts and plasticizers.

*Example*

Monomeric styrene was polymerized on a semi-works scale in a steel tower closely similar to that illustrated in the drawings and having a capacity of about 10 tons. The polymerization schedule was: 84 hours at 100° C., and 24 hours at 150° C., after which the polymer was heated during 24 hours to 250° C. and removed from the tower by extrusion. At no time during polymerization did the temperature in any part of the mass exceed the selected polymerizing temperature by more than a few degrees. The product was uniform, crystal clear, practically free of volatile matter, and had an average molecular weight exceeding 100,000.

We are aware that others have previously described large vessels provided with internal cooling which were said to be useful in the mass polymerization of monovinyl compounds, and we make no claim to such apparatus broadly.

What is claimed is:

1. In a method for the mass polymerization of a liquid which polymerizes exothermically to a thermoplastic resin, wherein the process is carried out in a zone having therein heat-transfer surfaces so arranged that substantially every portion of the liquid is within three inches of such a surface, the area of such surface being at least 3 square feet per cubic foot of liquid, the improved method of preventing destructive overheating during polymerization which comprises periodically detecting the temperature of the polymerizing mass at each of a plurality of points spaced throughout the zone at a frequency of one point for at most every six cubic feet of polymerizing mass, and supplying cooling to all heat-transfer surfaces whenever the temperature at any of the detecting points exceeds the predetermined value.

2. A method for the mass polymerization of styrene which comprises introducing the styrene into a zone having hollow indirect heat-transfer conduits extending through it, the conduits being so arranged that substantially every portion of the styrene is within two inches of the external surface of a conduit and being of such size as to present an outside surface area in the zone between 3 and about 30 square feet per cubic foot of styrene, starting polymerization by heating the conduits to raise the styrene to a predetermined polymerizing temperature, allowing polymerization to proceed while periodically detecting the temperature of the polymerizing styrene at a plurality of points spaced throughout the zone at a frequency of one point for at most every six cubic feet of styrene and passing cooling fluid at a temperature below the polymerizing temperature through the inside of all conduits whenever the temperature of any of the detecting points exceeds the predetermind polymerizing temperature, and withdrawing polystyrene from the zone when polymerization is substantially complete.

References Cited in the file of this patent

UNITED STATES PATENTS

| | | |
|---|---|---|
| 2,136,422 | Fields | Nov. 15, 1938 |
| 2,345,013 | Soday | Mar. 28, 1944 |